Figure 1:
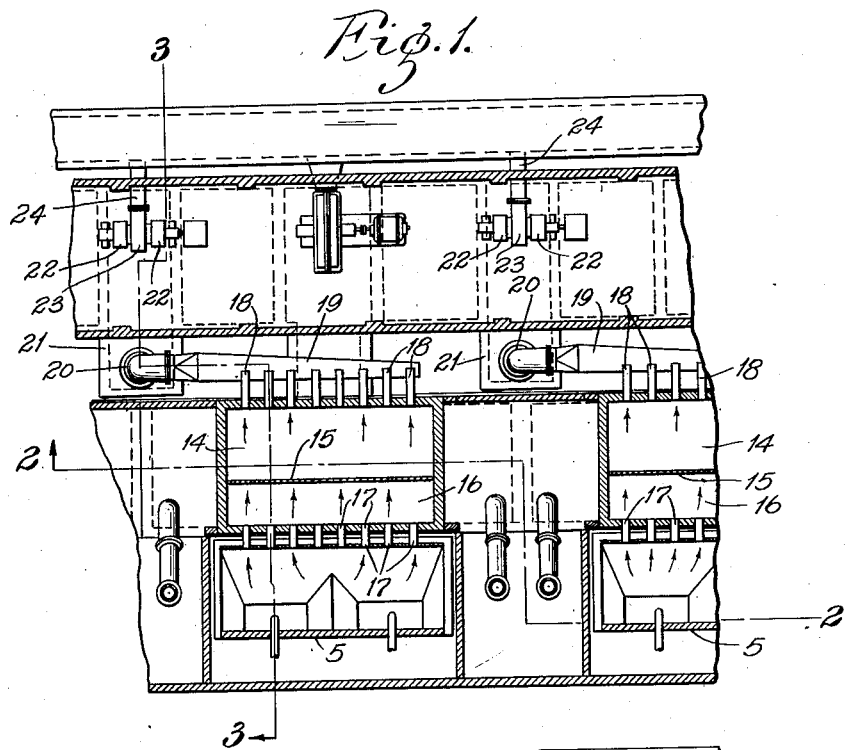

March 7, 1933.    J. E. GREENAWALT    1,900,234
METHOD OF COOLING SINTERED MATERIAL
Filed March 21, 1931    2 Sheets-Sheet 1

INVENTOR:
JOHN E. GREENAWALT.
By Harry A. Berines
ATTORNEY.

March 7, 1933.   J. E. GREENAWALT   1,900,234
METHOD OF COOLING SINTERED MATERIAL
Filed March 21, 1931   2 Sheets-Sheet 2

INVENTOR:
JOHN E. GREENAWALT
BY Harry Beimes
ATTORNEY.

Patented Mar. 7, 1933

1,900,234

UNITED STATES PATENT OFFICE

JOHN E. GREENAWALT, OF NEW YORK, N. Y.

METHOD OF COOLING SINTERED MATERIAL

Application filed March 21, 1931. Serial No. 524,353.

My invention has relation to improvements in methods of cooling freshly sintered material and it consists in the novel features more fully explained hereinafter in the specification and pointed out in the claims.

It is common practice in the metallurgical industry to sinter certain materials, such as fine ores, flue dust and other kindred materials for the purpose of putting them in better physical condition for subsequent treatment. One method of sintering such materials is known as the intermittent method whereby a large quantity (several tons) of material is charged into a rotatable holder in which the sintering operation takes place, after which the sintered material is dumped into a receiving hopper from which it is discharged with a separation of the fines (material in such finely divided condition as to require resintering) for such disposition as may be required.

The freshly sintered material is practically red-hot and in order that it may be conveniently handled, its temperature has to be greatly reduced. At the same time, the dumping operation produces a considerable quantity of dust and noxious gases which must also be controlled so as not to be liberated into the atmosphere.

In my pending application, Serial No. 359,873, filed April 30, 1929, I describe an apparatus for and method of collecting the dust produced in the dumping operation in which steps are also taken to reduce the temperature of the freshly sintered material by a flow of air through the mass thereof. However, I have learned in practice that the mere passage of atmospheric air through the mass of sintered material does not sufficiently reduce the temperature to permit effective subsequent handling. I have accordingly evolved the present process which is directed principally to the provision of effective means of cooling the freshly sintered material, although the operation of collecting the dust is also greatly improved.

Figure 2:
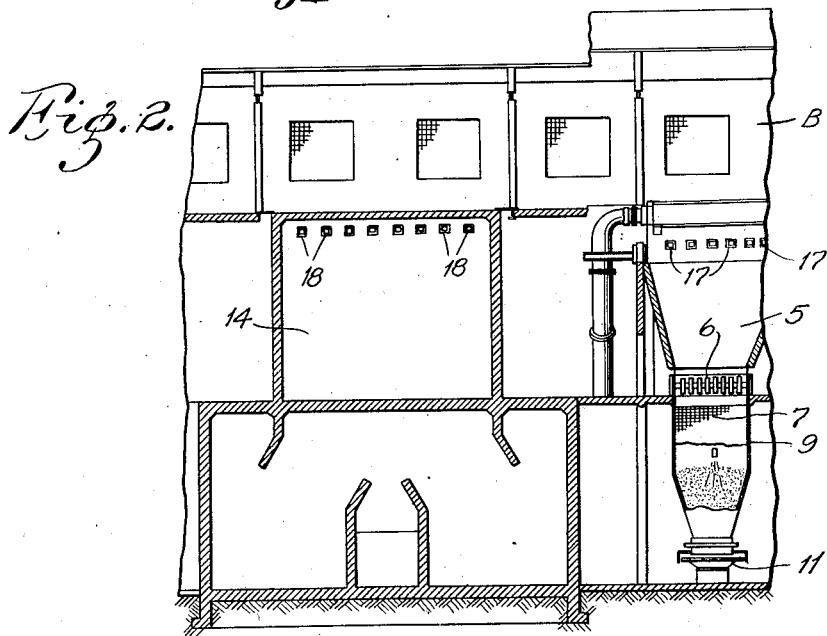
Figure 3:
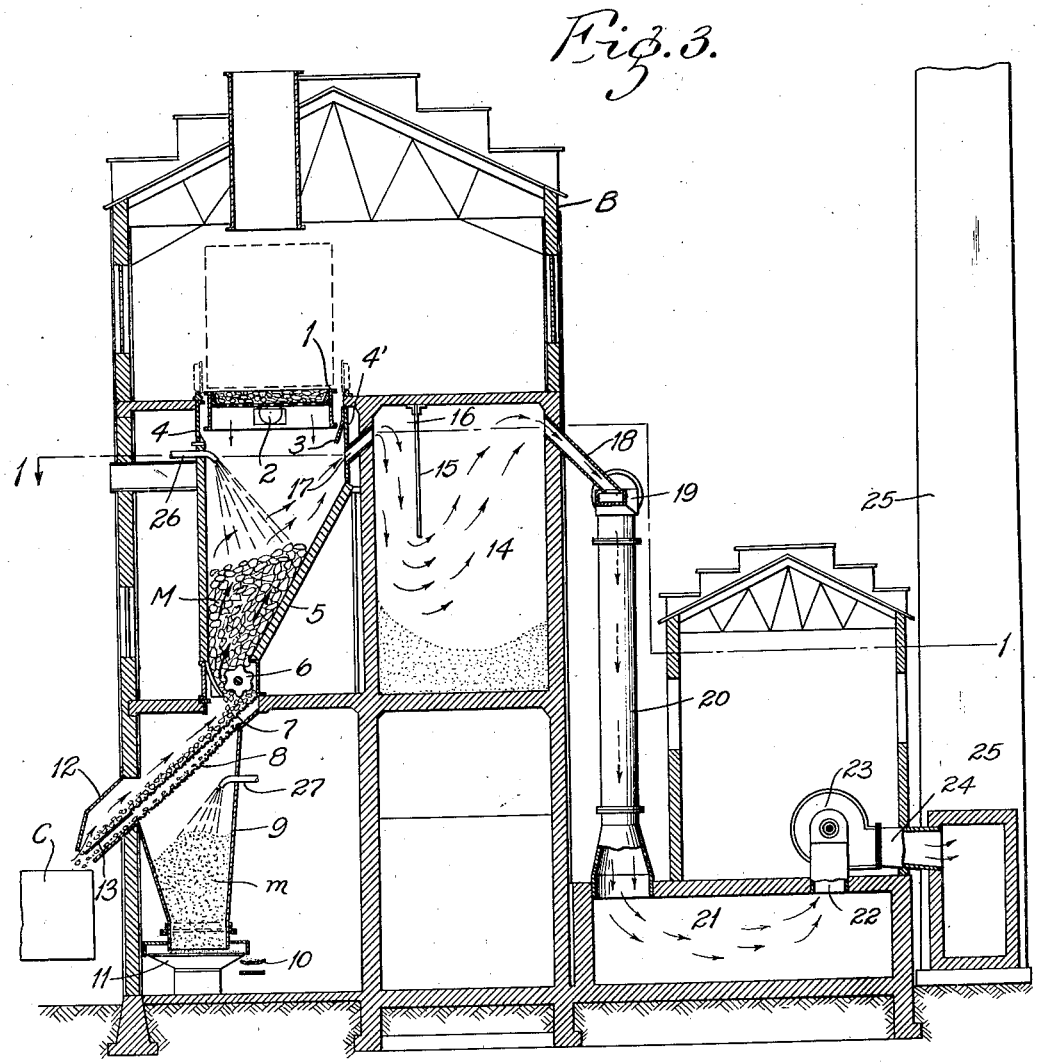

From the foregoing, it is apparent that the principal object of the invention is to provide a process that is effective in cooling freshly sintered material, at the same time embodying features that improve the operation of the dust collecting element thereof. It is a further object of the invention to provide an efficient method of cooling freshly sintered material without the introduction of a multiplicity of steps or complicated mechanism of any kind and without the necessity of removing the material from the receiving hopper into which it is discharged. Further and other advantages will be better apparent from a detailed description of the invention in connection with the accompanying drawings in which:

Figure 1 is a horizontal, transverse section of the apparatus utilized in practicing my process, the plane of said section being indicated on the line 1—1 of the elevational view shown in Fig. 3; Fig. 2 is a vertical, longitudinal section taken on the line 2—2 of Fig. 1; Fig. 3 is a vertical cross-section taken on the line 3—3 of Fig. 1.

Referring to the drawings, B represents the building housing the sintering plant comprising a sintering pan or holder 1, in which the material is charged for sintering. This pan is of the usual intermittent type rotatably mounted on trunnions 2 and provided with means 3 for sealing the clearance space between the pan and adjacent confining plates 4, 4' of the character described in my co-pending application above referred to. A sinter receiving hopper 5 is disposed below the pan 1 for the purpose of receiving the freshly sintered material M that is dumped from the pan 1. The lower end of hopper 5 is closed against the free discharge of material by a sinter crusher and feeder 6, which is adapted to break up the larger lumps of material as they issue from the hopper 5 and feed them onto an inclined screen 7. A second screen 8 is disposed below screen 7 to effect a second screening operation, and all material of a size that will pass over either screen 7 or 8 discharges into the railway car C while the finer material that passes through screen 8 will be received into a hopper 9 therebelow. This finer material is known as "fines" and is fed onto a belt conveyor 10 by a table feeder 11 and returned to the raw material supply to be mixed with unsintered material. It will be observed that a hood 12 is placed over the discharge apron 13 leading from screen 7 so as to reduce the size of the sinter discharge opening that is exposed to the atmosphere and thereby prevent any appreciable dust discharge into the atmosphere. Adjacent to hopper 5 is a dust collecting chamber 14 having a depending baffle 15 for deflecting the dust laden gaseous currents, and the passage 16 on one side of the baffle 15 is connected with the interior of hopper 5 by a series of inclined ducts 17. The main portion of chamber 14 is provided with a series of branch pipes 18 leading from points near the top of said chamber into a header 19 connected to a main 20. The lower end of the main 20 is connected with a conduit 21 from which there are a pair of oppositely disposed pipes 22 connecting said conduit with a blower 23, having an outlet 24 connected to stack 25. It is thus apparent that when the blower 23 is in operation it will exhaust air through the dust collecting chamber 14 and hopper 5 into which the air enters through the opening at the end of hood 12 where the sintered material is discharged. Obviously the dust that is raised in the hopper 5 by the dumping of the freshly sintered material therein will be picked up by the air stream and conducted into the collecting chamber 14 wherein it will be precipitated by the sudden deflection of the air currents therethrough.

However, it is not my object merely to collect dust but to effect a thorough and complete precipitation of the dust in the chamber 14 and at the same time accomplish a very great reduction in the temperature of the hot sintered material. For this purpose, I introduce into the hopper 5 a water discharge nozzle 26 from which the water issues in a fine spray and is discharged over the surface of the material M in the hopper 5. The steam that is generated by the contact of the water with the hot material will fill the upper part of the hopper 5 and serve to assist the air currents passing through said hopper in picking up the suspended dust particles and carrying them through the conduits 17 into the dust collecting chamber 14. It is apparent that it is difficult to introduce a sufficient amount of water at one point to effect a sufficient cooling of the hot sintered material thereof. The fines $m$ will still retain considerable heat and I find it advantageous to introduce a second water spray through a nozzle 27 leading into the hopper 9. The spray from the nozzle 27 is directed onto the surface of the material $m$ and the steam generated by the impinging of the water on the hot material will rise in the hopper 9, traverse screens 8 and 7 and be caught up by the flow of air (indicated by arrows) and enter the hopper 5 with the air currents. Obviously, the mixed air and steam traversing the mass M of material in hopper 5 will serve to reduce the temperature of said material before it has been sprayed by the water from nozzle 26. By the time the material $m$ is discharged from the hopper 9, it has been three times cooled—first by steam and air when in the hopper 5, then by the water spray in said hopper and finally by the water spray in hopper 9, so that on being discharged onto the conveyor 10, its temperature is such that it may be handled with comfort.

I have found that the function of the apparatus as a dust collector is greatly improved by augmenting the air flow with steam and water vapor. The mixed air and steam provides a very effective vehicle for carrying the dust particles out of hopper 5 and allowing them to be precipitated in the dust collecting chamber 14.

Having described my invention I claim:

1. The method of cooling sintered material which comprises dumping the freshly sintered material into a closed hopper, screening the finer particles therefrom and collecting the fines into a separate fines hopper, spraying water onto the fines, causing air to traverse the closed hopper, and causing the steam generated in the fines hopper to traverse the closed hopper.

2. The method of cooling sintered material which comprises dumping the freshly sintered material into a receiving chamber, screening the fines therefrom, wetting said fines to reduce the temperature thereof, and causing the steam generated thereby to traverse the receiving chamber.

3. The method of cooling sintered material which comprises dumping the freshly sintered material into a receiving chamber, screening the fines therefrom, wetting said fines to reduce the temperature thereof, and causing the steam generated thereby and air to traverse the receiving chamber.

4. The method of cooling sintered material and collecting the dust therefrom, which comprises dumping the freshly sintered material into a confined space, applying water to the mass of material so confined, causing a current of air to traverse the mass of material and pass into a dust collecting chamber whereby the dust is precipitated.

5. The method of cooling sintered material and collecting the dust therefrom, which comprises dumping the freshly sintered material into a confined space, applying water to the mass of material so confined, causing a current of air to traverse the mass of material, and exhausting the generated steam and air through a dust collecting chamber whereby the dust is precipitated.

6. The method of cooling sintered material and collecting the dust therefrom, which comprises dumping the freshly sintered material into a confined space, applying water to the mass of material so confined, causing a current of air to traverse the mass of material and pass into a dust collecting chamber whereby the dust is precipitated, inducting steam and air into said space for commingling with the dust therein, and exhausting said steam and air through a collecting chamber to precipitate the dust.

7. In combination with a sintering pan, a receiving hopper for freshly sintered material therebelow, means at the bottom of said hopper for closing the same against the free discharge of material therefrom, means for spraying water onto the material in said hopper, a dust collecting chamber adjacent to the hopper, and means for causing air to traverse the material in the hopper, said means also operating to draw air and the steam generated in the hopper through the dust collecting chamber.

In testimony whereof I hereunto affix my signature.

JOHN E. GREENAWALT.